United States Patent [19]

Kozek

[11] 4,280,164

[45] Jul. 21, 1981

[54] FAIL-SAFE RELAY SYSTEM

[75] Inventor: Edward P. Kozek, Southbury, Conn.

[73] Assignee: IMS Ltd., Quebec, Canada

[21] Appl. No.: 60,228

[22] Filed: Jul. 24, 1979

[51] Int. Cl.³ .................................................. H01H 47/32
[52] U.S. Cl. ..................................... 361/179; 340/507;
340/552; 192/129 R; 361/175
[58] Field of Search ............... 361/170, 174, 179, 191,
361/193; 340/279; 192/129; 112/219 A

[56] References Cited

U.S. PATENT DOCUMENTS

| 3,412,292 | 11/1968 | Forbes | 361/179 |
|---|---|---|---|
| 3,660,731 | 5/1972 | Darrow | 361/179 |
| 3,704,396 | 11/1972 | MacDonald | 361/173 |
| 3,761,738 | 9/1973 | Kay et al. | 307/140 |
| 3,836,828 | 9/1974 | Siggel | 361/179 |
| 3,858,095 | 12/1974 | Friemann et al. | 361/179 |
| 3,953,770 | 4/1976 | Hayashi | 361/179 |
| 4,075,961 | 2/1978 | Harris | 112/219 A |
| 4,130,764 | 12/1978 | Darrow | 307/218 |

*Primary Examiner*—J. D. Miller
*Assistant Examiner*—L. C. Schroeder
*Attorney, Agent, or Firm*—Mattern, Ware, Stoltz & Fressola

[57] ABSTRACT

A fail-safe relay system for use in infrared security barriers or other apparatus producing a sensing signal so as to control the de-activation and permit the re-activation of an interconnected device; such as a machine press. The relay system uses two relays with contacts in series in conjunction with electronic circuitry. Safe-start operation for preventing reactivation of the interconnected device if any unsafe condition exists, including failure of either pair of relay contacts to open when an unsafe condition is sensed, is also accomplished.

8 Claims, 10 Drawing Figures

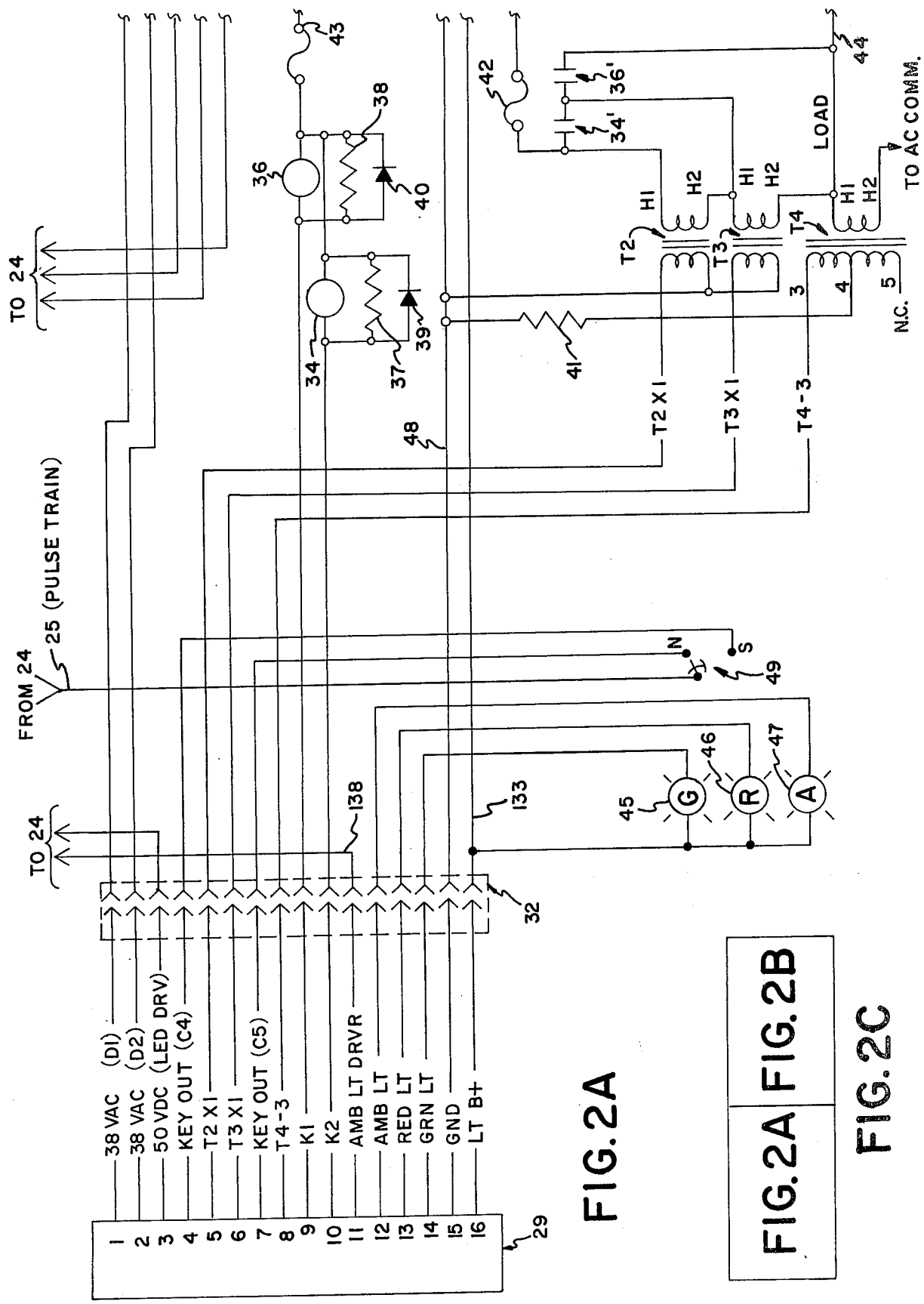

| FIG. 3A |
|---|
| FIG. 3B |
| FIG. 3C |

FIG. 5
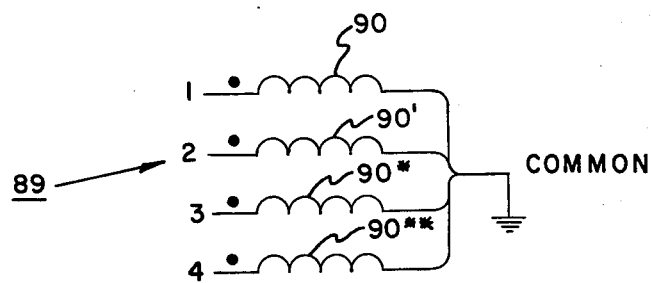
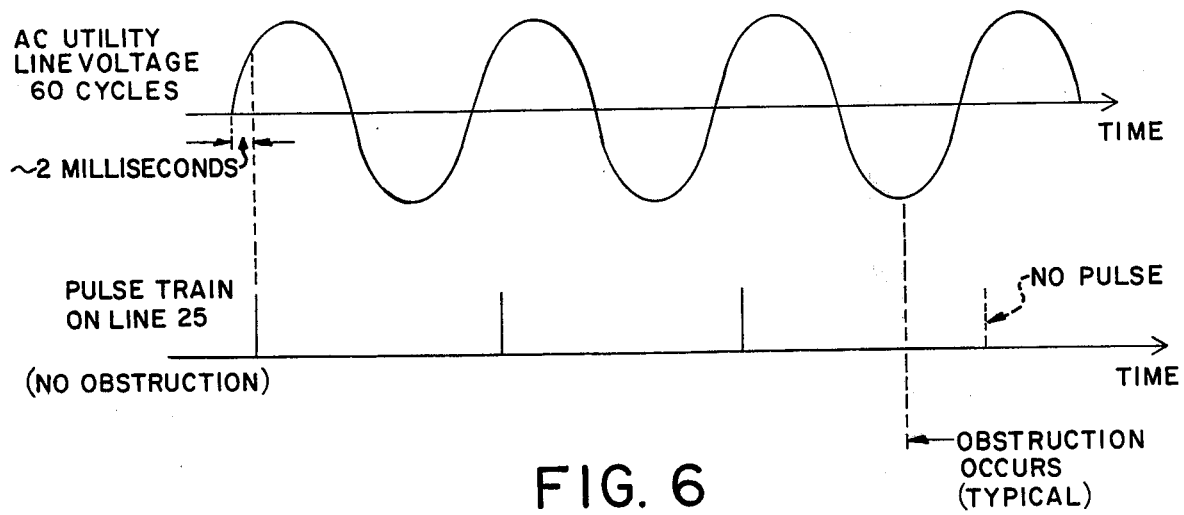
FIG. 6

FAIL-SAFE RELAY SYSTEM

TECHNICAL FIELD

The present invention relates to relay systems and particularly those of a fail-safe nature. It also relates to associated circuitry to enable relays to operate in such a fashion. Such fail-safe relay systems may be used as part of infrared security barriers or other devices for guarding a given area from human operator obstruction during times when the operator may be injured if a portion of his or her body (such as a hand) is in the guarded area; such, as during a power stroke of a machine press.

BACKGROUND ART

The present invention is directed to a fail-safe relay system for use in infrared security barriers and other devices which must operate in a fail-safe manner. In an Underwriters' Laboratories (UL) publication entitled "Subject 491, OUTLINE OF THE PROPOSED INVESTIGATION FOR PRESS CONTROLS (QUKU, QUQQ)", February 1975 at paragraph 34, the Operation and Component Failure Requirements for Machine Press Controls are enumerated. A fail-safe operation of the press control under component failure conditions as specified in paragraph 5.3-5.9 include the following conditions with respect to relays: relays with mechanical malfunction (blocked open or closed); relay coils under open conditions; and the relay contacts under permanently weld-closed conditions. All of these conditions must give rise to fail-safe operation of the press control apparatus; that is, either the safe shut-down of the press or continuation of the press control apparatus in an unimpaired manner.

Safe-start operation is also required; that is, if either pair of relay contacts remain closed after shut-down, the interconnected machine cannot be restarted even if no obstruction exists in an area to be guarded against human obstruction.

The above criterion for fail-safe operation has posed a problem in the security barrier field since fail-safe operation of the apparatus, such as an infrared security barrier, must be obtained even if relay contacts of the apparatus are welded closed. To meet this fail-safe criterion as well as the others mentioned above, the present invention incorporates two relays which must both be energized (that is; their relay contacts closed) in order for the interconnected device (such as a machine press) to be activated. This relay system incorporates circuitry which receives pulse information indicating the presence or absence of an obstruction in a guarded area so as to cause the relay contacts to open if an obstruction is sensed. However, after the obstruction is removed and re-start of the interconnected device is attempted, such reactivation can only occur if both pairs of relay contacts are open. In a situation where one of the relay contacts remains closed after sensing an obstruction in the guarded area, reactivation of the interconnected device is prevented. This satisfies UL's standard that any one relay can fail at a given time, but if there is a relay failure, safe-start operation requires preventing the interconnected machines from restarting until the relay is operating normally.

In order to obtain these objectives, the relay system incorporates circuitry which allows reactivation of the relay coils only if no obstruction exists and if both relay contacts are in the open position. Failure of either of these prerequisites to exist prevents reactivation of the interconnected device.

Fail-safe circuitry under the above UL standard requires that any one circuit component failure cannot cause unsafe operation of the interconnected machine. The failure modes for circit components in addition to relays are:

(1) for carbon resistors: open circuit or short circuit,
(2) for wirewound resistors: open circuit,
(3) for capacitors: open circuit or short circuit,
(4) for semiconductor devices: open circuit or short circuit being any two junctions,
(5) for circuit breakers: open circuit or failure to open under over-load or short circuit conditions,
(6) for fuses: open circuit,
(7) for transformers: open circuit or short circuit for any winding.

The present fail-safe relay system is designed to operate in a fail-safe manner for any circuit component failure.

Table 1 lists prior art references in the relay system art.

TABLE 1

| U.S. Pat. No. | Inventor | Date of Issue |
|---|---|---|
| 3,412,292 | Forbes | 1968 |
| 3,660,731 | Darrow | 1972 |
| 3,704,396 | McDonald | 1972 |
| 3,761,738 | Kay et al | 1973 |
| 3,858,095 | Friemann et al | 1974 |
| 3,936,828 | Siegal | 1974 |
| 3,953,770 | Hiyashi | 1976 |
| 4,075,961 | Harris | 1978 |

All of the listed patents disclose relay systems with either means for keeping relays energized in response to a pulse stream or means for controlling machine operation in response to detection of an individual in proximity to a detector. Fail-safe features are disclosed as enumerated below, but none of these references alone or in combination with each other disclose or suggest the circuitry of the present invention, and specifically, none disclose or suggest safe-start prevention of reactivation of the interconnected machine or device under situations of relay contact permanent closing or welding.

Specifically, U.S. Pat. No. 3,412,292, Forbes, discloses a dual relay system for liquid flow control systems which employs proximity switches to control the liquid-flow controllers. The specific embodiment shown in FIG. 3 of Forbes utilizes two relays but dies not disclose the failsafe circuitry of the present invention and specifically does not disclose circuitry for preventing the interconnected device from being reactivated (coming back on line) after a shut-down if the relay contacts remain closed due to relay component failure.

U.S. Pat. No. 3,660,731, Darrow, discloses a fail-safe pulsating peak detection circuit which utilizes current through a relay that is proportionate to the peak values of incoming pulses. This is then used by a full-wave rectifier bridge to energizes a relay coil. This type of circuitry is unlike the fail-safe relay system of the present invention including circuitry for preventing reactivation of an interconnected device when either pair of relay contacts remains in the closed position.

U.S. Pat. No. 3,704,396, Macdonald, discloses a safety device for use on machines. It discloses the use of a plurality of light sources and a corresponding plurality of photoresponsive devices in which each light source is powered by a modulated electric supply and is aimed at the corresponding photo responsive device. The output of each photo responsive device is reshaped and compared with the input of the light source so that any mismatch causes a machine operation to stop. Although multiple light sources and receivers are used in a manner which can be used to generate the pulses for use with the present failsafe relay system, this reference does not disclose or suggest use of dual relays for insuring a fail-safe relay operation.

U.S. Pat. No. 3,761,738, Kay et al, discloses a remote control electrical circuit. Other than the use of a triac type thyristor in the circuitry, this reference does not disclose or suggest the failsafe relay system of the present invention.

U.S. Pat. No. 3,858,095, Friemann et al discloses a protective circuit arrangement for band cutter machines so as to immediately stop the band cutter when it is touched. A fail-safe relay system is not disclosed in this reference.

U.S. Pat. No. 3,936,828, Siegel, discloses an electronic protection and sensing apparatus including an antenna positioned about equipment to be protected and coupled to a resistor-capacitor bridge to which an oscillator is connected. Although this reference discloses apparatus for use in protecting operators of machinery as do infrared security barriers for which the present fail-safe relay system may be employed, this reference does not disclose or suggest the fail-safe relay system of the present invention.

U.S. Pat. No. 3,953,770, Hayashi, also is directed to safety equipment for machinery including presses and shearing machines which utilizes generation of a high frequency electric field for sensing the presence of an operator's hand so as to insure that the operator's hand does not enter a protected area. This reference does not disclose or suggest the failsafe relay system of the present invention which can be used in conjunction with such safety equipment.

Finally, U.S. Pat. No. 4,075,961, Harris, discloses a proximity detector device which utilizes radio frequency signal detection for energizing circuitry which in turn controls a relay for de-energizing an interconnected achine. The relay is not of a failsafe nature as presented in the present invention.

Consequently, although a number of prior art references are directed to relay systems and devices used for protecting operators from hazardous regions of machinery (for which such fail-safe relay systems can be utilized), none of these references alone or in combination with each other disclose or suggest the features of the failsafe relay system according to the present invention, including fail-safe relays and fail-safe electronic circuitry.

DISCLOSURE OF THE INVENTION

The present invention is directed to a failsafe relay system which can be used in conjunction with safety apparatus for safely controlling interconnected devices (machinery) such as machine presses and the like so as to guard a certain area of any such device and thereby prevent an operator from placing his or her body in the guarded area without the machinery coming to a safe stop. Typically, such safety apparatus utilizes a field in the guarded area so as to sense a capacitive or electromagnetic change when an operator puts a hand or other body part in the guarded area. Other types of safety apparatus use an infrared or visible light detecting system for sensing entry into a guarded area. An infrared security barrier for which the fail-safe relay system of the present invention forms a part is known as the Dual-Lite/ISB 4 Infrared Security Barrier; Dual-Lite, Inc. of Newtown, Conn. being the assignee of the present invention.

Such safety apparatus has become increasingly important due to the Occupational Safety Health Administration (OSHA) requirement for press brakes and the like as set forth in 29 CFR 1910.217(c) entitled "Safeguarding the Point of Operation". OSHA requires that the safety apparatus protect the operator by being connected to the control circuit of the press brake to activate the brake if the operator's hand or other body part enters the area being guarded. Underwriters' Laboratories in their "Subject 471", entitled "OUTLINE OF THE PROPOSED INVESTIGATION FOR PRESS CONTROLS (QUKU, QUQU)", February, 1975 sets forth criteria for failsafe relay operation including the proper operation of safety apparatus even if relay contacts are mechanically held closed or are welded closed.

The present invention provides a failsafe relay system which will cause the interconnected device such as a machine press to come to a safe stop regardless of any component failure of the fail-safe relay system including such failure component modes as welded relay contacts, permanent open relay contacts, and mechanical malfunction holding the relay contacts in either the open or closed position.

The failsafe relay system comprises two relays with their contact pairs serially connected, requiring closure of both contact pairs in order to allow activation of the interconnected device. Control of each relay coil, which in turn control closure of the relay contacts, is provided by electronic circuitry which not only senses a pulse stream indicating the presence or absence of an obstruction within a guarded area, but also only allows reactivation of the interconnected device if both relay contact pairs are in the open position prior to attempting reactivation. The circuitry includes two transformers for sensing the opened or closed state of the relay contact pairs so as to allow the logic generated pulse train representing non-entry into the guarded area to drive a first winding of a pulse transformer if both relay contacts are open and the operator properly momentarily closes a switch so as to request reactivation of the interconnected device. A third transformer senses line voltage on the output line interconnected to the control circuit of the machine and allows the logic circuit pulse train to drive circuitry which in turn drives a second winding of the pulse transformer that maintains energization of the relay contacts. Interruption of the logic pulse train (representing obstruction of the guarded area) causes de-energization of the second pulse transformer winding and thus a safe shut-down of the interconnected device. By utilizing two relay contacts in series with each other, mechanical closure or welding of either relay pair of relay contacts does not prevent the safe shut-down of the interconnected device when obstruction of the guarded area occurs.

Therefore, a principal object of the present invention is to provide a fail-safe relay system for use with safety apparatus, which when interconnected to an external device will cause the safe shut-down of the external device when the presence of a person or object is sensed within a guarded area of the external device;

Another object of the present invention is to provide a failsafe relay system of the above character which utilizes more than one relay for insuring the safe shut-down of the interconnected device even if one of the relay contacts is mechanically held in a closed position or is welded closed due to some form of electrical malfunction;

A further object of the present invention is to provide a failsafe relay system of the above character in which reactivation of the external device is prevented unless there is no obstruction within the guarded area and all relay contacts of the failsafe relay system are in the open position;

A further object of the present invention is to provide a failsafe relay system of the above character which utilizes transformers for sensing the closed or opened state of the relay contacts, which in conjunction with a pulse train indicating the presence or absence of an obstruction within the guarded area provides for de-activation of the interconnected device and allows for re-activation of the device if the guarded area is clear and if the relays are operating normally;

A still further object of the present invention is to provide a fail-safe relay system of the above character in which any component failure does not prevent the relay system from continuing to operate in a failsafe manner; that is, to either cause the safe shut-down of the interconnected device upon occurrence of a component failure or to allow continued operation of the relay system to as to cause a safe shut-down of the interconnected device when an obstruction within the guarded area occurs;

Another general object of the present invention is a failsafe relay system which can be used with a signal representing the OFF or permissible ON state of an interconnected device so as to control the OFF and permissible ON states of an interconnected device;

Other objects of the present invention will in part be obvious and will in part appear hereinafter.

THE DRAWINGS

For a fuller understanding of the nature and objects of the invention, reference should be made to the following detailed description taken in conjunction with the accompanying drawings, in which:

FIG. 2A is a schematic diagram of a portion of the invention, including the relay sensing transformers, relays and indicator lights;

FIG. 2C is a diagram showing how FIGS. 2A and 2B are put together to form FIG. 2;

FIG. 3C is a diagram showing how FIGS. 3A and 3B are put together to form FIG. 3;

FIG. 5 is a schematic diagram of the pulse transformer used to activate the relay coil controlling thyristor; and FIG. 6 is a diagram of the input AC line voltage and its relationship to the incoming pulse train representing the non-obstruction (pulse present) or obstruction (pulse non-present—shown in phantom) of a guarded area.

BEST MODE FOR CARRYING OUT THE INVENTION

Figure 1:
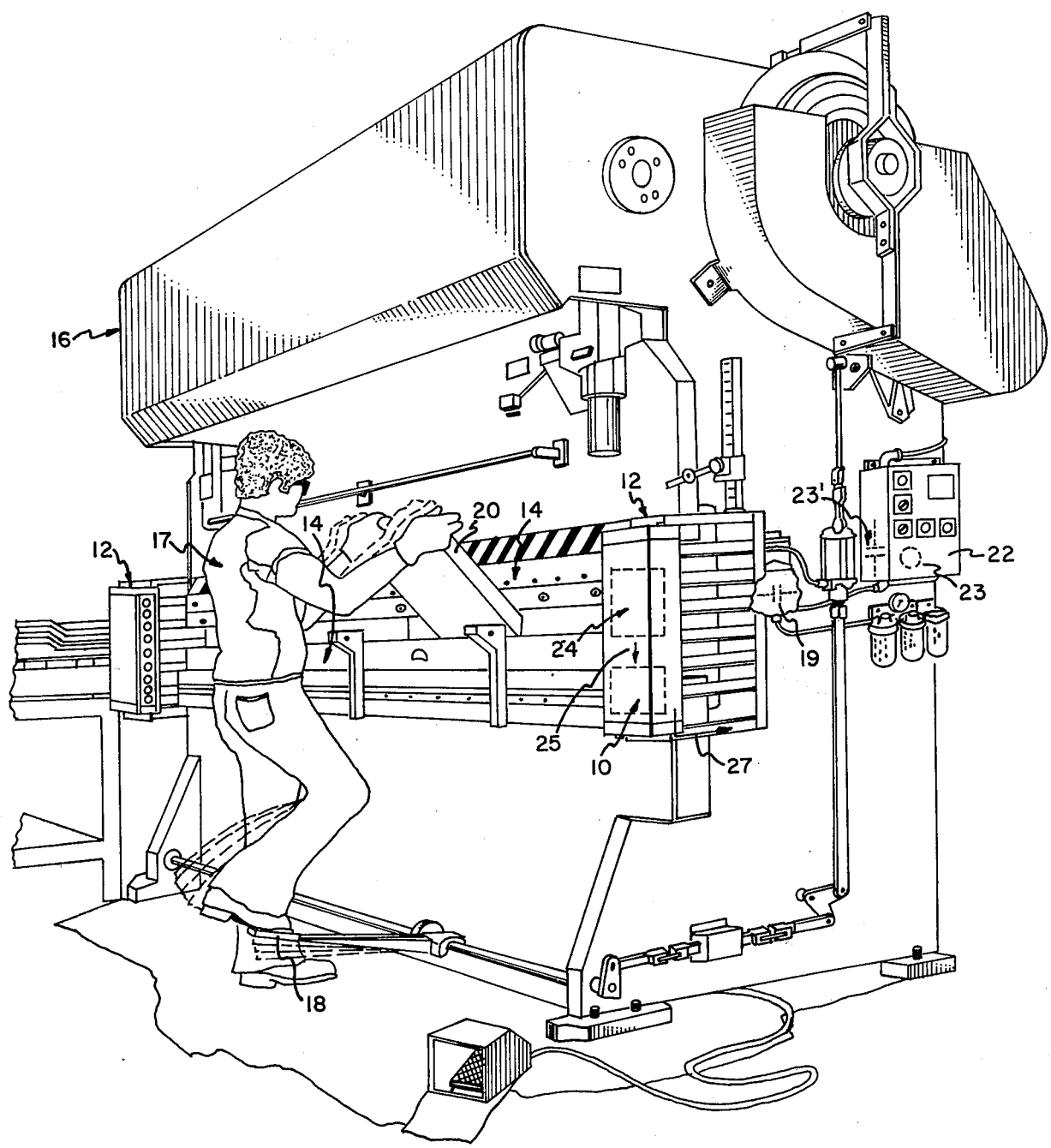
FIG. 1 is a perspective view of a machine utilizing an infrared security barrier which in turn uses a failsafe relay system to control activation of the machine brake so as to protect the operator from loss of limb or other harm when operating the machine.

As best seen in FIG. 1, a fail-safe relay system 10 according to the present invention may comprise a part of a safety apparatus or device, such as an infrared security barrier 12 which senses an area 14 to be guarded against entry by an operator 17 during use of a machine such as machine press 16. Typically, use of such a machine requires the operator to activate a foot pedal 18 for palm button or foot treadle so as to close switch contacts 19 (in phantom) and cause the machine press to enter a power stroke so as to perform some useful task to a workpiece 20. This is typically performed by the switch contacts connectors a utility AC power source (such as 120 VAC line voltage) to a starting relay coil 23 forming part of the machines' control circuitry 22.

Because of the inherent danger of such machines, there is a need to insure that the operator does not have a hand, arm or other part of his or her body within the guarded area 14 during activation of the machine power stroke. The infrared security barrier 12 or other device for sensing a guarded area (such as devices which sense the operator's electrical capacity when a portion of his or her body is within the guarded area) is utilized to prevent actuation of the power stroke unless the operator is completely outside of the guarded area.

In order to bring the machine to a safe, quick stop, the infrared security barrier 12 or other device is interconnected to the machine control circuitry 22 so as to prevent actuation of the machine control circuitry starting relay 23 (shown in phantom) by the foot pedal switch contacts 19 unless the operator is completely outside of the guarded area.

In the preferred embodiment of the present invention (see FIG. 2B) a LOAD line 44 connects to the output line 27 which in turn provides utility AC power to switch contacts 19 only if safe operating conditions exist. Such machines typically have special brakes for bringing the machine to the quick, safe stop once its starting relay is de-activated. The fail-safe relay system 10 of the present invention is interconnected to other circuitry 24 forming the infrared security barrier or other device with which it is used so as to receive electronic information from this circuitry 24 representing the presence or absence of an obstruction within the guarded area. The fail-safe relay system can be used with an infrared security barrier (called Dual-Lite ISB/4™) manufactured by Dual-Lite, Inc., the present assignee. This infrared security barrier produces a pulse train on logic line 25 (see FIG. 6) by its infrared security barrier electronics 24. If no obstruction of guarded area 14 exists, the pulses will occur during each positive half cycle of the utility AC but with a time delay of about 2 milliseconds from the start of each utility AC positive half cycle (see FIG. 6). If an obstruction exists the pulse train ceases (as shown in phantom for the fourth illustrated pulse in FIG. 6). Thus the pulse train on logic line 25 indicates the presence or absence of an obstruction within the guarded area.

It should be emphasized that the fail-safe relay system according to the present invention can be used with any type electronic circuitry forming an apparatus which requires fail-safe operation so as to control some other interconnected device such as a machine press and the like. Although the pulse train generated by the electronics 24 of the infrared security barrier operates at the utility power 60 hertz, other electronic signals including pulse trains at higher or lower frequencies can be utilized to sense the presence or absence of an object within a guarded area. Indeed, virtually any type of signal of a repetitive nature having at least two different states representing ON or OFF may be used as the sensed input to the fail-safe relay system. Thus, the fail-safe relay system need not be used with electronic circuitry for only sensing the presence or absence of an object within a guarded area but may also be used where an interconnected device must be stopped and prevented from starting until some safe condition exists.

Figure 2B:
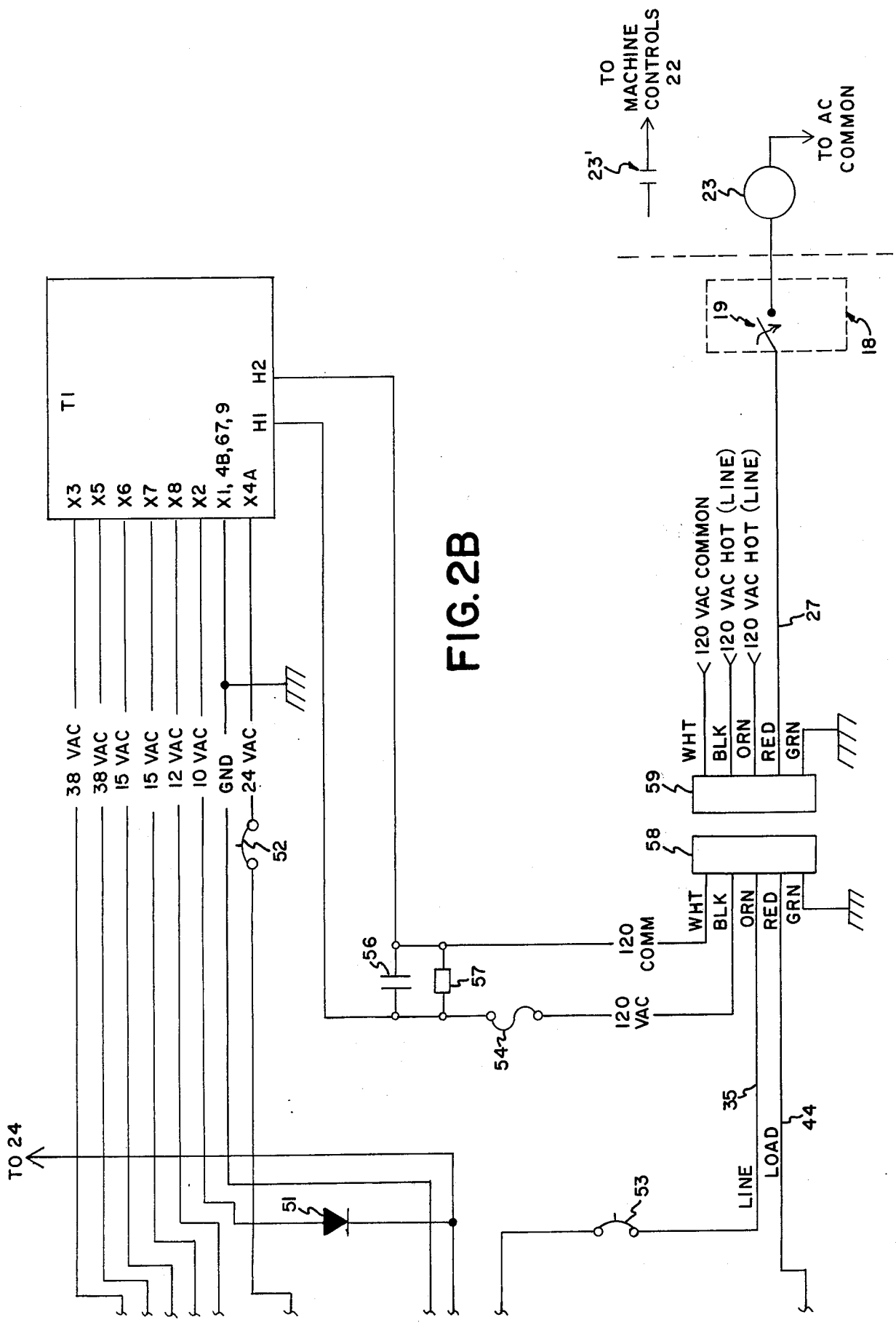
FIG. 2B is a continuation of FIG. 2A and illustrates the power transformer and output load line interconnection to the external device to be controlled by the present invention.
Figure 3A:
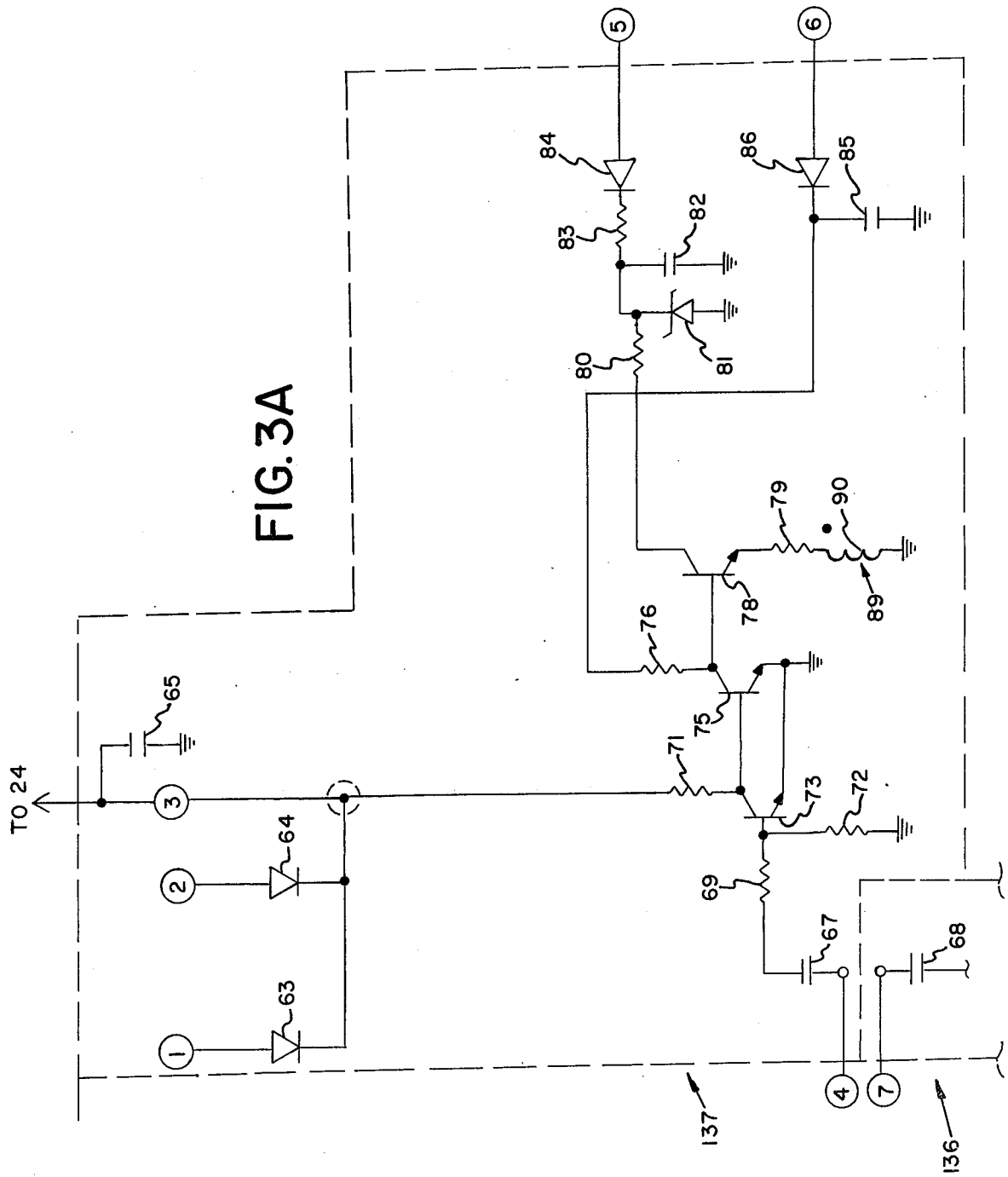
FIG. 3A is a schematic diagram of the initialization circuitry associated with the coil contact sensing transformer so as to provide initial activation of the relay coils.
Figure 3B:
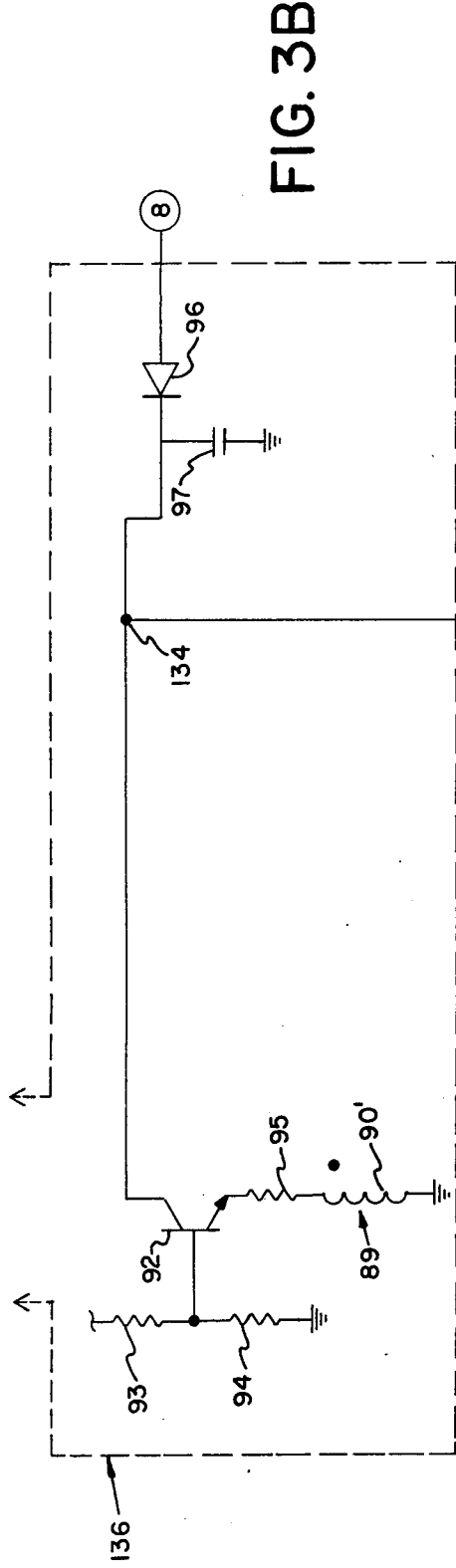
FIG. 3B is a continuation of FIG. 3A and illustrates the maintenance electronic circuitry to continue activation of the relay coils and to drive the indicator lights.
Figure 3B:
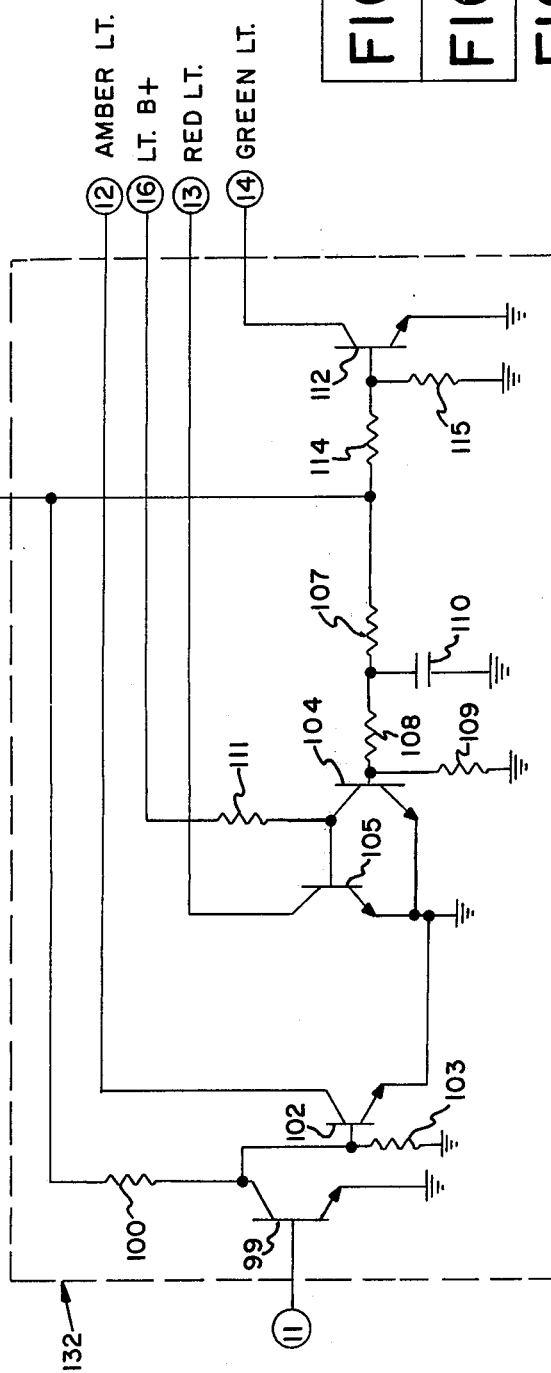
Figure 4:
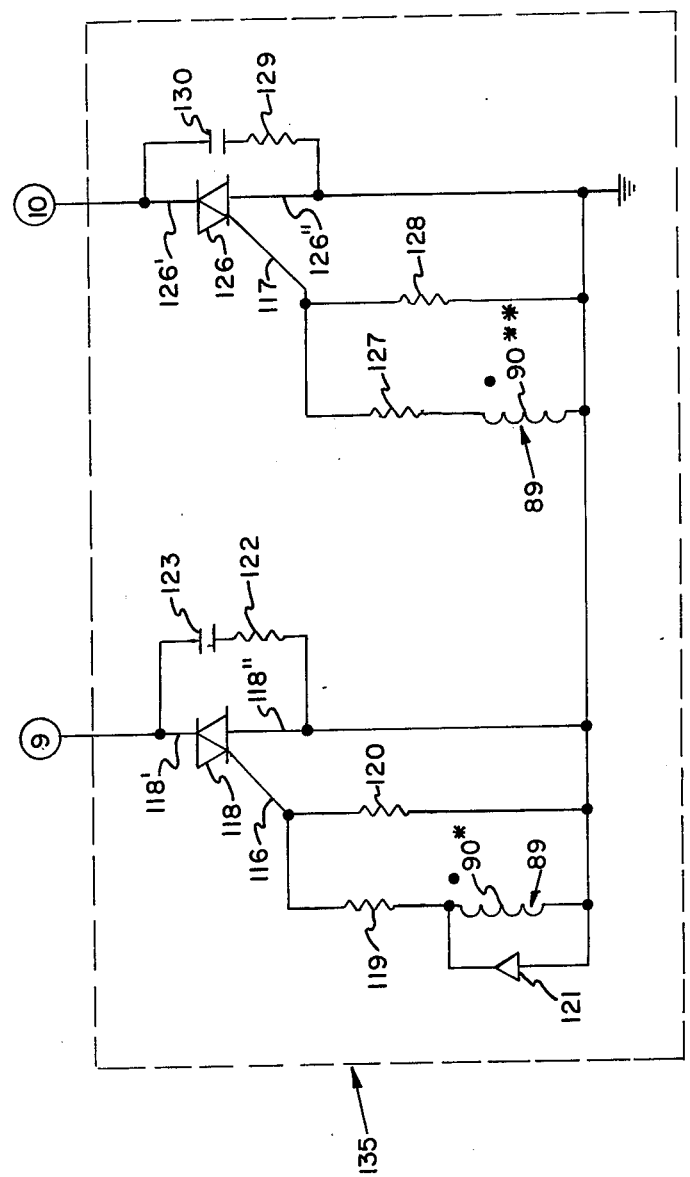
FIG. 4 is a schematic diagram of the circuitry for energizing the relay coils.

The electrical circuitry for carrying out the fail-safe relay system 10 is shown in FIGS. 2, 3 and 4. Interconnections between FIGS. 2, 3 and 4 are shown by circles with numbers within them and by rectangle 30 in FIG. 2A showing corresponding connections with these numbers. Thus, for example, in FIG. 3A diode 30 is interconnected to line 1 of rectangle 30 of FIG. 2A which as shown in FIG. 2B goes to output terminal X3 of power transformer T1 which has a 38 VAC output. Thus, diode 30 receives this 38 VAC power. A connector 32 is shown in FIG. 2A which allows interconnection of the circuitry shown in FIGS. 3A, 3B and 4 with the circuitry shown in FIGS. 2A and 2B. This is just the particular connector utilized in the present invention and any other circuit interconnection techniques well-known in the art may be used.

All of the circuit components of the fail-safe relay system are identified and described in Table 2.

TABLE 2

| Reference Number | Circuit Component | Description or Value |
|---|---|---|
| 34 | First Relay Coil | 12 VDC SPDT (Arrow M) |
| 34' | First Relay Contacts | 12 VDC SPDT (Arrow M) |
| 36 | Second Relay Coil | 12 VDC SPDT (Arrow M) |
| 36' | Second Relay Contacts | 12 VDC SPDT (Arrow M) |
| 37 | Resistor | 1K ½W 10% |
| 38 | Resistor | 1K ½W 10% |
| 39 | Diode | Edal Part No. BA5E9 |
| 40 | Diode | Edal Part No. BA5E9 |
| 41 | Resistor | 4.7K ½W 10% |
| 42 | Fuse | 2 8/10A Fast Blow |
| 43 | Fuse | ½A Slow Burn |
| 45 | Lamp | GE Part #755, Drake Green Lens |
| 46 | Lamp | GE Part #755, Drake Red Lens |
| 47 | Lamp | GE Part #755, Drake Amber Lens |
| 49 | Switch Lock | |
| 51 | Diode | Edal Part No. BA5E9 |
| 52 | Circuit Breaker | ½A (Heinemann) |
| 53 | Circuit Breaker | 2A (Heinemann) |
| 54 | Fuse | 1A Fast Blow |
| 56 | Capacitor | .15Mf 400V (CDE) Panasonic |
| 57 | Varistor | Panasonic |
| 58 | Connector | 7 Circuit (ITT Cannon) |
| 59 | Connector | 7 Circuit (ITT Cannon) |
| 63 | Diode | Edal Part No. BA5E9 |

TABLE 2-continued

| | | |
|---|---|---|
| 64 | Diode | Edal Part No. BA5E9 |
| 65 | Capacitor | 330Mf 80V |
| 67 | Capacitor | .01Mf 25V Min |
| 68 | Capacitor | .1Mf 25V Min |
| 69 | Resistor | 4.7K ½W 10% |
| 71 | Resistor | 100K ½W 10% |
| 72 | Resistor | 20K ½W 5% |
| 73 | Transistor | 2N2432 |
| 75 | Transistor | 2N2432 |
| 76 | Resistor | 47K ½W 10% |
| 78 | Transistor | 92PU 45 |
| 79 | Resistor | 20Ω ½W 5% |
| 80 | Resistor | 20Ω ½W 5% |
| 81 | Zener Diode | 30V IN4751 |
| 82 | Capacitor | 2.2Mf 50V Min (Nichicon) |
| 83 | Resistor | 200Ω ½W 5% |
| 84 | Diode | Edal Part No. BA5E9 |
| 85 | Capacitor | 2.2Mf 50V Min (Nichicon) |
| 86 | Diode | Edal Part No. BA5E9 |
| 89 | Pulse Transformer | Each winding 90, 90', 90* and 90** having 15 ½ turns #36 AWG heavy Nylese wire. Bobbin - Ferroxcube #1408 FID, Core-Ferroxcube #1408-3B7 (see FIG. 5 for schematic representation of windings) |
| 92 | Transistor | 92PU 45 |
| 93 | Resistor | 1K ½W 10% |
| 94 | Resistor | 10K ½W 10% |
| 95 | Resistor | 10Ω ½W 10% |
| 96 | Diode | 1N 4004 |
| 97 | Capacitor | .22Mf 25V Min |
| 99 | Transistor | 2N2432 |
| 100 | Resistor | 300K ½W 10% |
| 102 | Transistor | 92PU 45 |
| 103 | Resistor | 150K ½W 10% |
| 104 | Transistor | 92PU 45 |
| 105 | Transistor | 92PU 45 |
| 107 | Resistor | 300K Wirewound (AMF-RCL) |
| 108 | Resistor | 150K ½W 10% |
| 109 | Resistor | 150K ½W 10% |
| 110 | Capacitor | .1Mf 25V Min |
| 111 | Resistor | 27K ½W 10% |
| 112 | Transistor | 92PU 45 |
| 114 | Resistor | 300K Wirewound (AMF-RCL) |
| 115 | Resistor | 150K ½W 10% |
| 118 | Triac | ECC Corp. Part #L2001M5 |
| 119 | Resistor | 100Ω ½W 10% |
| 120 | Resistor | 1K ½W 10% |
| 121 | Diode | Edal Part No. BA5E9 |
| 122 | Resistor | 82Ω ½W 10% |
| 123 | Capacitor | .1Mf 25V Min |
| 126 | Triac | ECC Corp. Part #L2001M5 |
| 127 | Resistor | 100Ω ½W 10% |
| 128 | Resistor | 1K ½W 10% |
| 129 | Resistor | 82Ω ½W 10% |
| 130 | Capacitor | .1Mf 25V Min |
| T1 | Transformer | H1-H2 Primary Winding Terminal 3-38 VAC Secondary Terminal 5-38 VAC Secondary Terminal 6-15 VAC Secondary Terminal 7-15 VAC Secondary Terminal 8-12 VAC Secondary Terminal 2-10 VAC Secondary Terminals 1, 4B, 6, 7, 9 GND Terminal 4A-24 VAC Secondary |

| | | Primary | Secondary |
|---|---|---|---|
| T2 and T3 | Transformer | | |
| | Volts | 120 VAC | 20 VAC |
| | Turns | 4000, 120 | 650 |

TABLE 2-continued

| | | | Primary H1-H2 | Secondary |
|---|---|---|---|---|
| | | Wire Size | #38 AWG | #38 AWG |
| T4 | Transformer | Volts | 120 | 26 VCT |
| | | Turns | 1800, 2 Kilohms nominal | 400 TAP at 200 |
| | | Wire Size | #35 AWG | #35 AWG |

Operation of the Fail-Safe Relay System

As best seen in FIGS. 2A and 2B, connector 59 mates with connector 58 so as to provide 120 VAC utility power across primary windings H1 and H2 of power transformer T1 while presenting 120 VAC line power to conductor 35. This line power is presented to circuit breaker 53 and fuse 42 and then to relay contacts 34' and 36' as well as to primary winding H1-H2 of transformer T2. Relay contacts 36' are connected to load line 44 which in turn is connected to primary winding H1-H2 of transformer T4 as well as to output line 27 through connector 58, 59. Output line 27 provides 120 VAC power to the user operator switch contacts 19. If line 27 has 120 VAC power and if switch is closed (such as by foot pedal 18 in FIG. 1), the starting relay 23 of the interconnected machine activates the machine control circuitry 22. It is thus apparent that unless relay contacts 34' and 36' are both in the closed position, utility line voltage cannot be presented to load line 44 and thus cannot be presented to output line 27. In such a situation, the closing of user switch contacts 19 cannot energize the interconnected starting relay 23.

It is also necessary that AC power remain present to relay 23 in order to keep the interconnected machine operatinf. Thus any unsafe condition sensed causes line 27 to become deactivated with the result that relay 23 stops the machine.

As seen in FIG. 2A, if relay contacts 34' are open, the 120 VAC line voltage is impressed across primary windings H1 and H2 of transformer T2 and similarly, if relay contacts 36' are open, the 120 VAC line voltage is impressed across primary windings H1-H2 of transformer T3. If both relay contacts 34' and 36' are open, the 120 VAC voltage is impressed across both these windings in series with the primary winding H1-H2 transformer T4. As indicated in Table 2, a primary winding impedance for transformers T2 and T3 at 60 cycles is typically 120 kilohms while the impedance across primary winding H1-H2 of transformer T4 is typically 2 kilohm at 60 cycles. Thus, the majority of the line voltage is impressed equally across primary windings H1 and H2 for transformers T2 and T3 when relay contacts 34' and 36' are in the open state.

Due to the high impedance of primary windings H1 and H2 of transformers T2 and T3, the current flow through these windings to load line 44 is approximately 0.5 milliamperes which is less than the amount of current necessary to energize the machine starting relay 23.

The secondary windings T2X1 and T3X1 for transformers T2 and T3 respectively provide a 20 VAC output signal if relay contacts 34' or 36' are in the open state. Similarly, the secondary winding of transformer T4 has a 26 volt center tap output between pins 3 and 4, with the center tap winding connected to resistor 41 which in turn is connected to the fail-safe system ground line 48. The other side of the secondary winding for transformer T4 (line T4-3) is presented to terminal 8 of FIG. 3B. This terminal has the 26 volt AC signal impressed on it when relay contacts 34' and 36' are closed thus causing the full 120 VAC line voltage to be impressed across windings H1 and H2 of transformer T4. When, however, either relay contact 34' or 36' is in the open condition, a much lower voltage is impressed across the primary winding of transformer T4 (either 1.97 VAC if one set of relay contacts is open or 0.99 VAC if both relay contact are open) with the secondary winding of transformer T4 having 0.43 VAC if one pair of relay contacts is open and 0.21 VAC if both pairs of relay contacts are open. Either of these much lower voltages on the secondary winding of transformer T4 represents the de-energized state for output line 27.

As shown in FIGS. 3A and 3B, terminal 7, which as shown in FIG. 2A receives the pulse train from the remaining circuit of the infrared security barrier or other device with which the failsafe relay system is associated, impresses the pulse train onto the base of transistor 92 by capacitor 68 and biasing resistors 93 and 94. The circuitry 136 is, as shown below, for maintenance of relay coil energization after their initial energization.

Thus, if the output of transformer T4 on line T4-4 indicates utility AC power on load line 44 (and thus output line 27), the voltage impressed upon diode 96, which is half-wave rectified and filtered by capacitor 97, is presented to the collector of transistor 92. Then when the pulse train as shown in FIG. 6 is impressed on the base of 92 from the safety device (such as an infrared security barrier) a current pulse flows from the collector to the emitter of transistor 92, through resistor 95 and to winding 90' of pulse transformer 89. As shown in FIG. 5, the pulse transformer windings are magnetically coupled to each other and therefore the passage of a pulse through winding 90' cause a corresponding voltage to be impressed on windings 90* and 90** of FIG. 4. FIG. 4 shows the relay coil gate circuitry 135. The voltages impressed upon windings 90* and 90** of pulse transformer 89 cause a voltage to be impressed on gates 116 and 117 of thyristors (here triacs) 118 and 126 respectively. The thyristors are then able to pass current through their output terminals 18', 118" for thyristor 118 and terminals 126' and 126" for thyristor 126. As shown in FIGS. 4 and 2A, the output terminal 118' is coupled to relay coil 36 while the output terminal 126' is coupled to relay coil 34. Since both relay coils are connected to winding X4A of transformer T1 having a 24 VAC output, the relay coils 36 and 34 are respectively energized when thyristors 118 and 126 are in their conducting state.

With the relay coils conducting, the relay contacts 34' and 36' are respectively maintained in their closed state and thus the interconnected relay coil is maintained in its energized state so long as switch 18 is closed (see FIG. 2B). Since a pulse is received each utility AC cycle (see FIG. 6), the coils conduct during each AC positive half cycle. This is enough to maintain the relay coils with sufficient magnetism to keep the relay contacts closed. Since the coils are not energized during the negative AC half cycles, resistors 37 and 38 in combination with diodes 39 and 40 respectively, provide a current path for the generated inductive coil current. Thus once the relay contacts have been closed, they are maintained closed through relay coils 34 and 36 energizations which in turn are maintained provided that the pulse train indicating non-presence of an object within a guarded area is received and a mechanical malfunction of the relay contact has not occurred.

The purpose for fuse 43 and circuit breaker 52 in series with relay coils 34 and 36 is to prevent an overload to these relay coils due to a malfunction of transformer T1 or any other source. Normally, circuit breaker 52 will open when an overload condition exists with fuse 43 acting as the failsafe component in conjunction with the circuit breaker since one of the failure modes of the circuit breaker is to have its contacts maintained in the closed position even when an overload exists. This aspect of the circuitry for the failsafe relay system is used throughout the invention so that any failure of any circuit component either causes the safe shutdown of the interconnected device or the continuation of operation of the fail-safe relay system. In the case of the circuit breaker 52, a failure, such as maintaining its contacts in the closed state even in the presence of an overhead, does not prevent the fuse 43 from operating so as to de-energize the relay coils when such an overload occurs. Thus a safe shut-down of the interconnected device by de-energizing output line 27 is achieved.

FIG. 3A shows the relay coil initial energization circuitry 137. The circuitry for initializing energization of relay coils 34 and 36 uses the outputs T2X1 and T3X1 of transformers T2 and T3 in conjunction with the pulse train from the presence sensing device (safety apparatus) to enable the relay contacts to become energized if, and only if, the pulse train indicates adsence of an obstruction within the guarded area, proper activation of switch lock 49, and open contacts for both relay contacts 34' and 36'. If any of these conditions is not present, the relay coils 34 and 36 will not become energized and thus, relay contacts 34' and 36' will not be closed which in turn causes prevention of output line 27 from becoming energized.

In order to describe the operation of the circuitry for initially energizing relay coils 34 and 36, it will first be assumed that relay contacts 34' and 36' are both in the open state. It will further be assumed that switch lock 49 is in the start or "S" position which causes the pulse train from the presence sensing device to be impressed upon terminal 4 of FIG. 3A which in turn impresses the voltage to the base of transistor 73. The collector of transistor 73 receives a DC voltage from the 38 VAC output terminals X3 and X5 of transformer T1 (see FIGS. 2A and 2B) which in turn is full-wave rectified by diodes 63 and 64 and filtered by capacitor 65. This DC voltage can also be used to power electronic circuitry in the presence sensing device electronics 24.

Terminal 5 as shown in FIG. 3A is connected to secondary winding T2X1 of transformer T2 while terminal 6 in FIG. 3A is connected to secondary winding T3X1 of transformer T3. As set forth in Table 2, the secondary windings of transformers T2 and T3 are the same and produce a voltage of approximately 20 VAC when 120 volts are impressed across their primary windings H1–H2. Thus, if both relay contacts 34' and 36' are in their open state, nearly the full 120 VAC line voltage is impressed across the series primary windings for transformers T2 and T3 causing a corresponding 10 VAC output signal on secondary windings T2X1 and T3X1 respectively. This 10 VAC voltage is half-wave rectified by diodes 84 and 85 with filtering and voltage clamping of this half-wave rectified voltage by capacitor 82 and zener diode 81 for secondary winding T2X1 and filtering by capacitor 85 for secondary winding T3X1. The filtered voltage from T3X1 is applied to the collector of transistor 75 through resistor 76 while the filtered and clamped voltage from secondary winding T2X1 is applied to the collector of transistor 78 through resistor 80.

Transistors 73 and 74 from a current amplifier for the incoming pulses to the base of transistor 73 so as to provide sufficient base current to transistor 78 to cause it to go into saturation whenever the current amplified pulse train is received; with the resultant pulsing of winding 90 of pulse transformer 89. As explained earlier, the pulsing of any winding of pulse transformer 89 causes a corresponding voltage pulse to be impressed upon the other windings of the pulse transformer, including windings 90* and 90**, which in turn gate ON thyristors 118 and 126 respectively. Thus, if the pulse train is received at terminal 4 (which occurs when the switch lock is placed in the momentary start position), if the power transformer T1 provides the 38 VAC power to terminals 1 and 2 of FIG. 3A so as to apply filtered DC power to the collector of transistor 73, and if both relay contacts 34' and 36' are open, the thyristors 118 and 126 will be activated which in turn will cause relay contacts 34 and 36 to become energized with the resultant closing of relay contacts 34' and 36'. This in turn causes the line voltage to be impressed on output line 27 so as to permit an interconnected device to be energized.

If relay contacts 34' and 36' are not both open at the time the pulse train is received at the base of transistor 73 by placing switch lock in the start position, a corresponding output voltage will not be impressed across either secondary winding T2X1 or T3X1 depending upon the closed state of relay contact 34' or 36' respectively. In a situation where relay contact pair 34' is closed, no AC voltage will be impressed on terminal 5 in FIG. 3A, and therefore no filtered DC voltage will be available at the collector of transistor 78. It will therefore be impossible to turn on transistor 78 and therefore impossible to pulse winding 90 of pulse transformer 89. Therefore, the thyristors 118 and 126 will not be gated ON and consequently, the relay coils will not be energized. Similarly, if relay contact pair 36' is closed prior to receiving the pulse train at the base of transistor 73, no AC voltage will be impressed upon terminal 6 of FIG. 3A, and therefore no rectified voltage will be impressed upon the collector transistor 75. Without collector voltage to transistor 75, the pulse train cannot be amplified by transistor 75 and therefore transistor 78 cannot be repetitively turned on by the amplified pulse train signal. Consequently, winding 90 of pulse transformer 89 cannot be pulsed causing de-energization of thyristors 118 and 126. It is therefore only possible when both relay contacts are open prior to receiving the pulse train at the base of transistor 73 that activation of relay coils 34 and 36 is possible.

Assuming that the relay contacts 34' and 36' are open prior to receiving the pulse train at the base of transistor 73, they will be closed by initialization circuit 137. Once these relay contacts are closed, the secondary outputs of transformers T2 and T3 will be approximately 0 volts due to the closure of the relay contacts. However, once the relay contacts are both closed, the full line voltage will be impressed across primary winding H1-H2 of transformer T4 causing a corresponding secondary voltage to be generated at winding terminal T4-3 which, as explained earlier, causes a rectified filter voltage to be impressed on the collector of transistor 92 as shown in FIG. 3B. Then, when switch lock 49 is returned to its normal "N" position, the pulse train indicating the non-obstruction of the guarded area is impressed upon terminal 7 (see FIG. 3A) which in turn is impressed on the base of transistor 92. Therefore winding 90′ of pulse transformer 89 is repetitively pulsed causing windings 90\* and **90\*\* of the pulse transformer to be similarly pulsed which in turn maintain activation of thyristors 118 and 126 so as to maintain relay contacts 34 and 36** in their energized state. The insure that the operator does not leave the switch lock in the "start" position, the switch lock when in the start position is only in that position momentarily. This momentary closure which is all that is needed to initialize energization of the relay coils with their maintenance in their energized state by returning the switch to the normal position.

If the operator holds the momentary switch in the "start" position, the relay contacts will close due to the energization of the relay coils 34 and 36. Once the contacts close, secondary windings T2X1 and T3X1 will become de-energized. This in turn will cause the coils 34 and 36 to become de-energized since the pulse train would not be impressed upon terminal 7 associated with output secondary winding T4-3 of transformer T4. In such a situation, the relay contacts 34′ and 36′ would thus close and open in a repetitive fashion until such time as the operator places switch 49 back to the normal position.

Thus, all of the Underwriter's Laboratories relay requirements for a failsafe relay system are met by the present invention. If either relay contact pair 34′ or 36′ is in the open state, output 27 is de-energized. If either relay contact pair 34′ or 36′ is mechanically held in the closed position or is welded closed, the system will still operate safety; that is, it will still de-energize output line 27 if an obstruction is sensed since the other relay contact can open. The system, however, cannot be reactivated until the malfunctioning relay contact is repaired or replaced. This is known as a safe-start. Since the relay contacts are in series, either one opening due to a malfunction will cause the output line 27 to become de-energized.

Other fail-safe features of the present invention are seen in FIGS. 2A and 2B. Thus circuit breaker 53 is in series with fuse 42 which in turn provides the line voltage from line 35 to the primary winding H1-H2 of transistor T2 and to relay contacts 34′. If an overload situation occurs in this line, circuit breaker 53 will open causing load line 44 to become de-energized with a resulting safe shut-down of an interconnected device. If the circuit breaker fails in the overload condition by staying closed, the fuse 42 will open and again cause load line 44 to become de-energized. Fuse 54 shown in FIG. 2B causes the de-activation of power transformer T1 if an overload condition occurs which in turn would cause the de-activation of relay coils 34 and 36 with the resultant opening of relay contacts 34′ and 36′.

In order to have a fail-safe operation of other circuit components, it is assumed that all carbon composition resistors can fail in either the short or open mode, that capacitors can similarly fail in both the open and short mode, and that wirewound resistors can only fail in the open mode. Transistors and other semiconductor devices are assumed to be able to fail by a short or open between any two junctions of the component. It will be noted that all of the electronic circuitry of the present invention operates in a fail-safe mode which meets these criteria.

For instance, referring to FIG. 3A the start-up circuitry is such that a failure of any circuit component will prevent the start-up of the fail-safe relays and thus a safe-start criterion is met. If capacitor 67 opens, pulse transformer 90 would not be activated. If capacitor 67 shorted, the start-up circuitry would continue to operate properly since the purpose of the capacitor is primarily for pulse-shaping of the pulse train with respect to the base of transistor 73.

A similar analysis can be made with all the other circuit components. For example, if transistor 73 has a short between its collector and emitter, it would be impossible to pulse transistor 75 with the signal coming to the base of transistor 73 and therefore winding 90 could not be properly pulsed to activate the thyristors. If the collector to emitter junction of transistor 73 were to open, it would similarly be impossible to pulse winding 90.

It should be noted that the pulse train has a frequency such that the gates 116 and 117 of thyristors 118 and 126 are turned on in the first quadrant of the AC line voltage presented to the thyristors and therefore, the thyristors do not conduct during the negative half cycle of the sine wave. However, since the thyristors do conduct during each positive half cycle of the sine wave, the relay coils 34 and 36 maintain their proper energization during such times that the thyristors are so activated. In this manner, a failure of either thyristor by shorting of terminals 118′ and 118″ or 126′ and 126″ cannot cause an unsafe condition to result. The reason is that diode 40 associated with relay coil 36 and diode 39 associated with relay coil 34 would for such an occurrence provide full impressing of that half cycle to ground without passing it through the relay coil. This in turn would cause either the circuit breaker 52 or the fuse 43 to open; thereby causing a safe shut-down of the interconnected device. Diodes 39 and 40, in association with resistors 37 and 38, also provide for allowing the re-circulating current due to the inductance of the relay coils to pass therethrough when the thyristors are operating properly and only conducting during the positive half cycle of the impressed line voltage sine wave.

As best seen in FIGS. 3A and 3B, light driver circuitry 132 is associated with green light 45, red light 46 and amber light 47 (see FIG. 2A) so as to give a visual indication of the status of the fail-safe relay system. The green light represents proper energization of the interconnected device with no obstruction; the red light indicates a state causing the interconnected device to be de-activated; and the amber light indicates when the relay contacts have been bypassed by someone through tampering and the guarded area has been obstructed, such as by the operator.

As shown in FIGS. 2A, 2B and 3B, a light B+ (LT B+) line 133 is provided with rectified power from the 10 VAC output terminal X2 of transformer T1 rectified by diode 51. This half-wave rectified voltage is applied to each light 45, 46 and 47 in parallel with their outputs interconnected to FIG. 3B at terminals 14, 13 and 12 respectively. If the fail-safe relay system is operating properly and the interconnected device is energizable (that is; output line 27 is energized with line voltage), an alternating rectified signal is presented at junction 134 of the coil energization maintenance circuit 136. This DC voltage is then impressed upon the base of transistor 112 through biasing resistors 114 and 115 which in turn cause transistor 112 to turn ON causing current to flow through green light 45.

If the fail-safe relay system causes the output line 27 to be de-energized, junction 134 will be at a low voltage state. This causes transistor 112 to cut off which causes green light 45 to turn OFF. However, transistor 105 will be turned ON since the light B+ voltage is applied to the base of transistor 105 through biasing resistor 111. Transistor 105 then turns on providing a current path for the red light coming into the collector of transistor 105 from terminal 13. This indicates to the operator that the fail-safe relay system is in the de-energized state.

The amber light 47 is only activated if relay contact pairs 34' and 36' are bypassed through tampering with the circuitry. If such tampering exists, obstruction of the guarded area 14 (see FIG. 1) will not cause the relay contacts to open. However, in such a situation, the pulse train coming to pin 7 of the coil energization maintenance circuit will not be present. When this occurs, a low voltage signal is received on the amber light driver line 138 (see FIG. 2A) which is generated from circuit electronics 24. This in turn is directed to the base of transistor 99 through terminal 11 (see FIG. 3B). Transistor 99 is then turned OFF allowing the DC voltage at junction 134 to be impressed upon the base of transistor 102 via biasing resistors 100 and 103. Transistor 102 then turns ON providing a current path for amber light 47. Under normal operating conditions a higher voltage signal is generated on line 138 which maintains transistor 99 in saturation, which in turn keeps transistor 102 in cut off. This in turn keeps amber light 47 OFF since no current path is present.

When the relays are not bypassed and a de-energized state for the fail-safe relay system occurs (such as an obstruction within the guarded area) junction 134 is at a low voltage which prevents the base of transistor 102 from being at a high enough voltage to turn the transistor ON and thereby maintains the amber light in the OFF state.

Also, although the present invention is directed to a fail-safe relay system used in conjunction with a device for sensing the obstruction or non-obstruction of an area to be guarded (such as an infrared security barrier) it can be used with other devices which provide a signal representing a desired ON or OFF state of some other interconnected device. This signal may be a pulse train as described herein or may be any other type of electrical signal which can be utilized in a fashion as described herein so as to cause an orderly de-energization of an interconnected device if a first OFF signal is sensed and the energization of an interconnected device if a second ON signal is sensed provided that the relay contacts are in the proper state at the time that initiation of the relay system is attempted.

It will thus be seen that the objects set forth above and those made apparent from the preceding description are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described and, all statements of the scope of the invention which, as a matter of language, might be said to fall therebetween.

Having described the invention, what is claimed is:

1. A fail-safe relay system for controlling the de-energization and permissible energization of an interconnected device in response to a signal having at least two states representing the same, comprising:
    (A) a first and second relay, each relay having a relay coil and a pair of relay contacts, the relay contact pairs serially connected to each other, connectable to a source of power at one end, and interconnectable to the device at the other end so as to de-energize the device if either or both pairs of relay contacts are open and to permit energization of the device if both pairs of relay contacts are closed;
    (B) means for sensing the open and closed state of each pair of relay contacts;
    (C) first and second thyristors, each interconnected with one of the relay coils so as to control energization and de-energization of the interconnected relay coil;
    (D) means for receiving the signal representing a desired de-energization or permissible energization of the interconnected device;
    (E) electronic initialization circuitry connected to the signal receiving means and the relay contacts state sensing means so as to energize the first and second thyristors if, and only if, the signal is in a first state and the relay contact sensing signals both indicate that the relay contacts are in the open state; and
    (F) means for maintaining energization of the thyristors once they have been energized by the initialization circuitry so long as the received signal continues to be in the first state.

2. A fail-safe relay system as defined in claim 1, wherein the relay contact sensing means comprise transformers with their primary windings each across one of the relay contact pairs.

3. A fail-safe relay system as defined in claim 1 wherein the source of power is utility AC power and wherein the signal is a pulse train having a frequency corresponding to the AC power, and wherein the relay system further comprises
    (G) means for de-energizing the relay coils if an overcurrent condition exists,
    (H) first and second diodes placed across the first and second relay coils, and wherein the means for energizing these thyristors causes each thyristor to be energized during the first quadrant of the AC power voltage sine wave so that the relay coils are energized during the first positive half cycle of the since wave;
whereby if either thyristor fails by short-circuiting, the negative half cycle of the sine wave will pass through the diodes so as to cause the overcurrent breaking means to de-energize the relay coils and thus de-activate the interconnected device.

4. A fail-safe relay system for use with a pulse signal representing the desired permissible or non-permissible energization of another device, this other device being interconnected to the fail-safe relay system directly or through a switch so as to allow the device's energization if the received pulse signal is of a first state and to cause its de-energization if the received signal is of a second state, comprising:
    (A) a first relay having a relay coil and a pair of relay contacts;

(B) a second relay having a relay coil and a pair of relay contacts, the relay contacts of the first and second relays being connected in series to an AC power source so as to present this source to an output line interconnected to the device or switch for controlling an interconnected device if, and only if, both relay contacts are closed;

(C) a first relay contact sensing transformer having a primary winding connected across the first pair of relay contacts and a secondary output winding for generating an alternating voltage of a first "ON" magnitude if the first pair of relay contacts are open and a second "OFF" magnitude if the relay contacts are closed;

(D) a second relay contact sensing transformer having a primary winding connected across the first pair of relay contacts and a secondary output winding for generating an alternating voltage of a first "ON" magnitude if the second pair of relay contacts are open and a second "OFF" magnitude if the relay contacts are closed, the primary windings of the first and second contact sensing transformers being connected in series from the power source to the output line connectable to the interconnected device;

(E) a third sensing transformer having a primary winding connected in series with the first and second relay contact sensing transformers so as to produce a secondary output alternating current voltage of a first "ON" magnitude if the power source voltage is fully presented on the output line, and a second lower voltage if the power source voltage is not fully presented on the output line;

(F) start-up initialization circuity connectable to the received pulse signal and to first and second sensing transformers secondary outputs, so as to generate an output signal if, and only if, both relay contacts are in the open state and the received pulse signal is in the first state;

(G) maintenance circuitry interconnected to the third sensing transformer secondary output and interconnectable to the received pulse signal so as to generate an output signal if, and only if, full power source voltage is present on the output line and the received pulse signal is of the first state; and (H) relay coil control circuitry for receiving the output signals of the initialization circuit and maintenance circuit so as to energize the relay coils whenever either signal is received.

5. A fail-safe relay system as defined in claim 4 wherein the relay coil control circuitry comprises first and second thyristors, each in series with one of the relay coils for energizing the relay coil upon receipt of an output signal from the initialization circuit or maintenance circuit.

6. A fail-safe relay system as defined in claim 5, further having means for indicating when the fail-safe relay contacts have been bypassed.

7. A fail-safe relay system as defined in claim 5, further comprising first and second diodes, each connected in parallel to one of the relay coils, a fuse and circuit breaker connected in series with the source of electrical power and the relay coils so as to de-energize the relay coils when an overload condition exists; and wherein the initialization circuit and maintenance circuit provide the output signals for activating the thyristors only during the first quadrant of the AC power source sine wave so that the relay coils are only energized during the positive half cycle of the power source; whereby if either thyristor short-circuits, the negative half cycle of the power source sine wave passes through the diodes so as to cause the fuse or circuit breaker or both to open, thereby de-energizing the relay coils.

8. A fail-safe relay system as defined in claim 4 or 5, wherein the initialization circuitry and maintenance circuitry comprise components, any one of which can fail at a given time, but if such failure occurs the relay system will either operate as if the failure did not occur or will de-energize the output line.

* * * * *